E. GARRETSON.
AUDIBILITY METER.
APPLICATION FILED MAY 8, 1919.

1,421,344.

Patented June 27, 1922.

INVENTOR.
Eugene Garretson
BY
J. W. M. Ellis
ATTORNEY.

E. GARRETSON.
AUDIBILITY METER.
APPLICATION FILED MAY 8, 1919.

1,421,344.

Patented June 27, 1922.
2 SHEETS—SHEET 2.

INVENTOR
Eugene Garretson
BY
J. W. M. Ellis
ATTORNEY

UNITED STATES PATENT OFFICE.

EUGENE GARRETSON, OF BUFFALO, NEW YORK, ASSIGNOR TO FEDERAL TELEPHONE AND TELEGRAPH CO., INC., OF BUFFALO, NEW YORK, A CORPORATION OF NEW YORK.

AUDIBILITY METER.

1,421,344.  Specification of Letters Patent.  Patented June 27, 1922.

Application filed May 8, 1919. Serial No. 295,808.

*To all whom it may concern:*

Be it known that I, EUGENE GARRETSON, a citizen of the United States of America, residing in the city of Buffalo, county of Erie, and State of New York, have invented certain new and useful Improvements in Audibility Meters, of which the following is a full, clear, and exact description.

My invention relates in general to audibility meters, and in particular to devices for measuring the strength of incoming radio signals or radio currents; for comparing the relative sensitiveness of a given telephone with a standard telephone; for comparing the relative sensitiveness of two telephones, when connected to a signal of standard strength; or other like purposes.

It is well known to those skilled in the art, that previous devices of this character have been constructed upon the shunt or potentiometer principle, and still others on the transformer principle. These latter, however, have been constructed with iron cores, output windings of inherently high resistance, and high impedance, and also with fractional turn windings, and like structural disadvantages. Moreover, both classes of previous devices have been inefficient, due to the fact that they have been fixedly calibrated to a given type of telephone, a standard telephone, or even a particular adjustment of a standard telephone. Such calibration has necessitated, in these instruments, a limited range, a fixed proportional range, or a range with but a few intermediate steps. Furthermore, such devices have not been constructed upon a basis which affords directly read comparative values without calculation, nor have they been adapted for comparison of telephone receivers upon both an impressed voltage and a current basis.

In devising my meter, I have sought to overcome all the disadvantages above enumerated, and to provide a meter having a very flexible scale, allowing of a practically unlimited number of intermediate steps in decimal arrangement.

Furthermore, I have sought to provide a meter so designed that the calibration may be approximately proportional, and one in which readings may be taken directly from the instrument without calculation.

Furthermore, my device is very simple and easy to operate, and the parts thereof will not easily get out of adjustment.

All the advantages above enumerated, and others which will be apparent to those skilled in the art, have been accomplished by the device shown in the accompanying drawings, in which.

The device comprises in general an air-core transformer, having a primary winding D, shunted by an adjustable, non-inductive resistance D'; a secondary winding F, connected through suitable switches to binding posts A and A'; and a tertiary winding H of ten and one-tenth turns, connected through suitable switches with the binding posts B and B'. This tertiary winding is controlled by a multiplier switch I, having three points, .1, 1 and 10, or such other arrangement as may be desired in connection with a variable winding. The switches for connecting these windings may be of any suitable form, and for convenience of illustration I have shown a form in which a series of buttons are arranged about a common center with a spring brush engageable with any one of the buttons. The one-tenth step of the tertiary winding may consist of an effective one-tenth turn, and this is preferably accomplished by winding a plurality of turns of wire about a small portion of the total magnetic flux of the transformer. For instance, where it is desired to secure the effect of a one-tenth turn, ten complete turns may be made to embrace only one per cent of the total magnetic flux.

My audibility meter is provided with an anti-capacity switch J, so that two receivers, being tested, may be connected in either series or parallel arrangement. The parallel arrangement is effected by a separate connection of the two telephones to separate windings of the instrument, and the series arrangement includes a single winding of the instrument. This is a very desirable and important feature when comparing the constructive merits of telephone receivers. An anti-capacity switch K is also provided, whereby the outside line, connected to binding posts C and C', may be connected to the primary winding of the transformer, or directly to the posts A and A' and telephone shunt resistance L.

Figure 1:
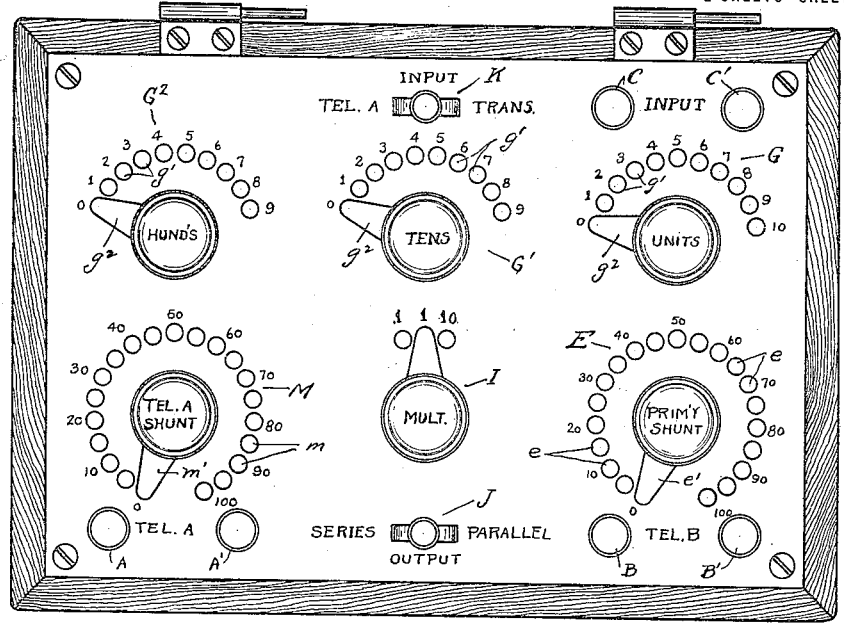
Fig. 1 is a plan view of my complete device with the cover thereof removed.
Figure 2:
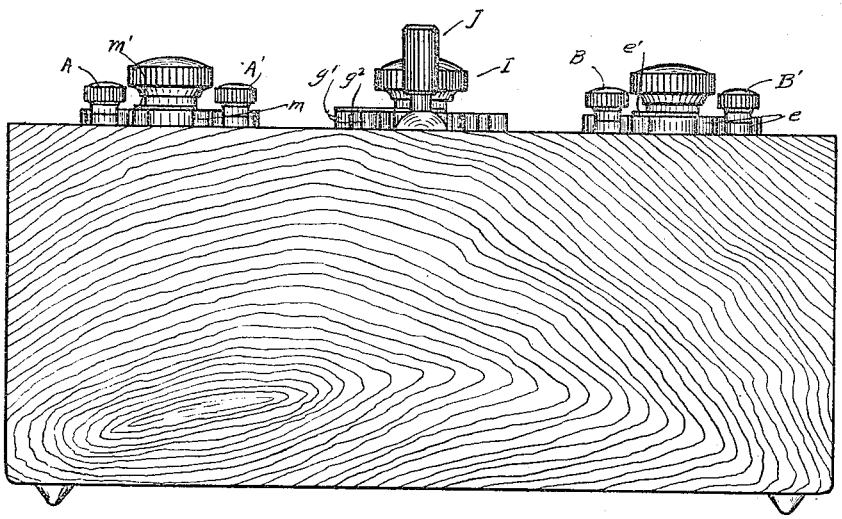
Fig. 2 is a side elevation of the same.
Figure 3:
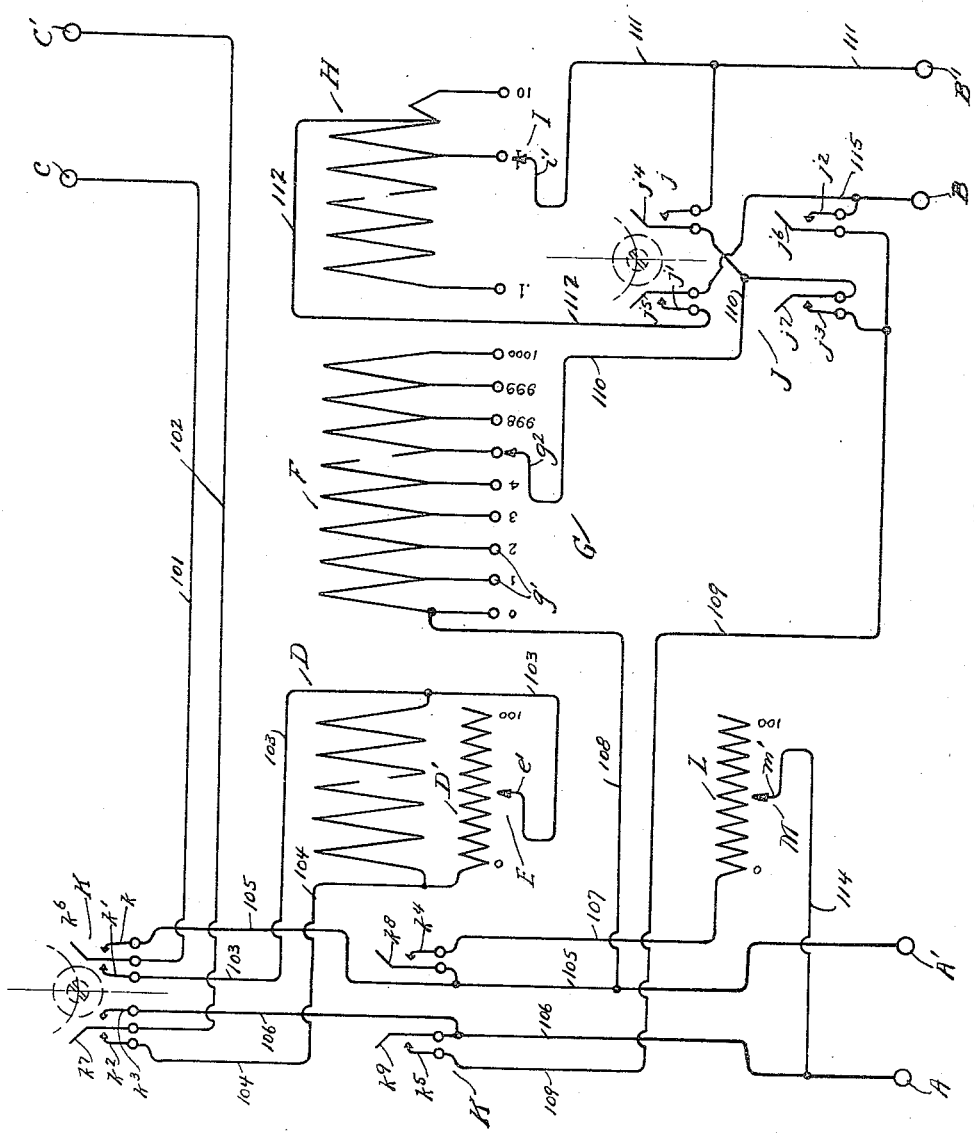
Fig. 3 is a diagrammatic view showing the different windings and connections of the device.

The secondary winding F is preferably controlled by three separate switches G, G' and G² (Fig. 1) arranged, respectively, in units, tens and hundreds. This switch is represented in Fig. 3 as one switch having contact points $g'$, and as having one switch arm $g^2$. The telephone shunt resistance L is connected to a switch M having contact points $m$ and a switch arm $m'$. The primary winding shunt D' is provided with a switch E, having contact points $e$ and a switch arm $e'$.

Reference is now to be had to Fig. 3, where all the elements of my device are shown diagrammatically. As shown in this figure the anti-capacity key K is provided with contacts $k$, $k^1$, $k^2$, $k^3$, $k^4$, and $k^5$, and has contact springs $k^6$, $k^7$, $k^8$, and $k^9$. The anti-capacity key J is provided with contacts $j$, $j^1$, $j^2$, and $j^3$, and with contact springs $j^4$, $j^5$, $j^6$ and $j^7$. The usual arm and roller, common in this type of switch, is, of course, provided for pressing the contact springs against the contacts.

The circuits of the device are as follows: A conductor 101 connects the binding post C with the switch spring $k^6$ of the anti-capacity key K, and a conductor 102 connects the binding post C' with the switch spring $k^7$ of this switch. A conductor 103 connects the contact $k'$ of the switch K with one side of the primary winding D, and with the arm $e'$ of the switch E. A conductor 104 connects the primary resistance shunt D' with the other side of the primary winding D, and with the contact $k^2$ of the switch K. The contact $k$ of the switch K is connected directly to binding post A' by means of the conductor 105. The contact spring $k^8$ of this switch is also connected with the conductor 105. The contact point $k^3$ is connected directly with the binding post A by a conductor 106, and also connected with this conductor is the contact spring $k^9$ of the switch. The telephone shunt resistance L is connected by means of the conductor 107 to the switch contact $k^4$ and the switch arm $m'$ is connected with the conductor 106 by the conductor 114. A conductor 108 connects one side of the secondary winding with the conductor 105. A conductor 109 connects the contact $k^5$ of the switch K with the contact $j^3$ and contact spring $j^6$ of the switch J. The arm $g^2$ representing the switch arms of the switches G, G' and G², is connected by means of a lead 110 to contact springs $j^4$ and $j^7$ of the switch J. The contact spring $j^5$ is connected with the contact $j^2$ and with the binding post B. The binding post B' is connected with the contact $j$ of the switch J, and also with the arm $i'$ of the multiplier switch I by means of a conductor 111. The tertiary winding H is connected with the contact $j'$ of the switch J by a conductor 112.

When my instrument is to be used, for instance, to measure the audibility of a radio current, the source of current is connected to binding posts C and C' of the instrument. The anti-capacity key K is then moved so as to connect the source of current directly through to the primary winding D of the transformer. A standard telephone receiver is connected to binding posts B and B', and the anti-capacity switch J is moved so that this standard receiver is connected directly to the tertiary winding H of the transformer.

The current will now flow from binding post C', over conductor 102, to spring $k^7$ and contact $k^2$, thence, over conductor 104 to primary winding D of the transformer, and to primary shunt resistance D'. A portion of the current will flow through the primary D to conductor 103, and a portion will also flow through the shunt resistance D' and arm $e'$ of the switch to conductor 103. The current will pass over conductor 103 to contact $k'$ and spring $k^6$, to conductor 101, and thence to binding post C. This current, passing through the primary, will induce a current in the tertiary winding H, and this current will pass from the winding, over conductor 112, to contact $j'$ and spring $j^5$, through conductor 115 to binding post B. This current will flow through the standard telephone receiver, and from binding post B' it will pass over conductor 111 to the arm $i'$ of the multiplier switch I, and thence back to the tertiary winding. The primary shunt switch E and the multiplier switch I are now both adjusted to the point of audition of the standard telephone. Now connect any receiver to the binding posts A and A', and, by means of the switch K, momentarily connect the current from binding posts C and C' directly to binding posts A and A' and the receiver connected thereto. When the switch K is set in this manner, the current will flow from binding post C', over conductor 102, through spring $k^7$ and contact $k^3$, over conductor 106 to binding post A, part of the current passing over conductor 114, to the arm $m'$ of the telephone shunt L, and over conductor 107 to contact $k^4$ and spring $k^8$ to conductor 105. The current which passes through the telephone receiver will return through binding post A' and over conductor 105, joining the current which passed through the shunt in passing on through conductor 105 to contact $k$ and spring $k^6$, and thence over conductor 101 to binding post C. When the switch K is in the position just described, the current flowing to the receiver connected to binding posts A and A', is adjusted by the telephone shunt resistance L until the sound produced in the telephone is of agreeable intensity. The switch K is now slowly moved back and forth, alternately connecting the current directly to the telephone receiver connected to the posts A and A', or indirectly to this telephone receiver through the primary and secondary windings of the device. Obviously, when the switch K is in the position to conduct the current to the primary winding, the contact $k^5$ and spring $k^9$ will also connect the binding posts A and A' with the secondary winding of the meter. The current flows to and from the winding, through the following conductors and contact members: from the secondary winding, over conductor 108, conductor 105, the telephone receiver connected to binding posts A and A', conductor 106, contact spring $k^9$ and contact $k^5$, conductor 109, contact $j^3$ and spring $j^7$ of the switch J, conductor 110, and arm $g^2$, back to the secondary winding. The strength of the secondary current is adjusted by means of the decade switches G, G' and $G^2$ (Fig. 1), represented by G in Fig. 3, until the sound produced in the receiver connected to the binding posts A and A' is of the same intensity with the switch K in either position, i. e., when the current from the outside source is directly connected to the receiver or when it is connected through the secondary winding. Now, as the sound in the standard receiver connected to the binding posts B and B' is of unit intensity when connected to the tertiary winding adjusted to one turn, the sound in the receiver connected to the binding posts A and A' is of greater intensity than the standard receiver, and this intensity is determined by the adjustment of the decade switches G, G' and $G^2$. The primary winding having been adjusted so as to produce the same audibility in the receiver connected to the binding posts A and A' when the current passes through this winding, or comes directly from its source, it is obvious that the adjustment of the switches controlling the secondary winding indicates the relative audibility of the incoming current as compared with the standard receiver of unit intensity connected to the binding posts B and B'. Thus, readings of the decade switches G, G' and $G^2$, when a balance in tone is obtained, directly indicates the strength of the incoming current without any calculation, provided the standard telephone receiver connected to the binding posts B and B' is connected by means of the multiplier switch I to a single turn of the tertiary winding. If, however, the multiplier switch I connects the standard telephone to the ten or the one-tenth turn of the tertiary winding, the reading obtained would indicate the strength of the incoming current to be multiplied by one-tenth or ten, whereby a true and correct reading is obtained.

To compare the sensitivness of two telephone receivers on a current basis; connect one telephone receiver to the binding posts A and A' and the other telephone receiver to the binding posts B and B'; set the switch J so that these two telephones are connected in series with each other, and with the secondary winding of the transformer. When connected in this manner the current will pass from the secondary winding, over conductor 108, to conductor 105, the receiver connected to the binding posts A and A', conductor 106, spring $k^9$, and contact $k^5$ of the switch K, conductor 109, to spring $j^6$ and contact $j^2$ of the switch J, through the receiver connected to the binding posts B and B', conductor 111, contact $j$, and spring $j^4$, and conductor 110, through a switch arm $g^2$, back to the secondary winding. The decade switches G, G' and $G^2$ are now adjusted until the weakest audible sound occurs in the more sensitive telephone, and the reading of the switches is taken. The current is now increased through the telephones by means of these switches until an audible sound in the less sensitive telephone is obtained, and a reading is taken. The relative sensitiveness of the two telephones is in inverse proportion to the respective readings taken.

The above test may be accomplished in another manner, as follows: With the telephone receivers connected as before, and with the decade switch G embracing a single turn of the secondary winding F, adjust the primary shunt resistance D' until the weakest audible sound occurs in the more sensitive telephone as above determined, increase the current by means of the decade switches until the weakest audible tone occurs in the less sensitive telephone. The last reading thus obtained directly indicates without calculation the relative sensitiveness of the two telephone receivers.

To compare the sensitiveness of the two telephones upon an impressed E. M. F. basis, attach one telephone to the binding posts A and A' and adjust the decade switches until an audible tone occurs in this telephone, using the primary shunt resistance D', if necessary, to bring the tone within the range of the instrument. Now remove the first telephone and attach the other telephone to the posts A and A', and adjust the decade switches until the weakest audible tone occurs in this telephone, without altering the adjustment of the primary shunt resistance. The sensitiveness of the two telephones at an impressed E. M. F. basis is inversely proportional to the two readings taken. When the above test is being made, the switch K will be so set that the current will flow from the binding post C, over conductor 101, spring $k^6$, and contact $k'$, conductor 103, primary winding D and shunt resistance D', conductor 104, contact $k^2$ and spring $k^7$, conductor 102, to binding post C'. The induced current in the secondary will flow from this winding, over conductor 108, conductor 105, the receiver connected to the binding posts A and A', conductor 106, spring $k^9$ and contact $k^5$, conductor 109, contact $j^3$ and spring $j^7$, conductor 110, back to the secondary winding.

The above tests may also be made by a second method, as follows: Attach the more sensitive telephone receiver to binding posts B and B'; adjust the primary shunt resistance D' and the tertiary winding by means of the multiplier switch I until the weakest audible tone occurs in this telephone. Note the reading of the multiplier switch. Then attach the less sensitive telephone to posts A and A' and adjust the decade switches without altering the position of the primary shunt resistance or multiplier switch, until the weakest audible tone occurs in this telephone. The latter reading, multiplied by the reading of the multiplier switch, indicates the relative sensitiveness of the two telephones. It will be understood that when an E. M. F. test is being made in this manner, the anti-capacity keys or switches J and K are so operated as to connect the primary winding with the incoming current, the secondary winding with the telephone attached to the binding posts A and A', and the tertiary winding with the telephone connected with binding posts B and B'. In other words, the telephones secured to binding posts A and A' and B and B' are connected to parallel windings.

In my meter, provision is made for the use of a constant by which the readings of the instrument may be multiplied, thus, where a range of 1000 possible steps exists, readings may be taken, if so desired, to values of 10,000, or the range of the instrument may be limited to one-tenth of the initial range of steps, or simply 100. The calibration of the instrument is adjustable so that practically any telephone receiver may be used as a standard of unit sensitiveness with which other receivers may be compared. The audibility of a radio current is measured by directly balancing sound volumes, and with my instrument these volumes may be simultaneously regulated to agreeable intensity without affecting the results obtained.

It is evident that with my meter a radio current of standard strength may be used to determine the sensitiveness of any receiver, no matter how widely it varies in resistance, or other characteristics, from any other receiver. As hereinbefore described, this is accomplished by using a standard current to excite the primary winding of the instrument, thereby determining the relative current strengths necessary to create the weakest audible tone in the receiver being standardized, or a previously standardized receiver.

The instrument may be used with equal efficiency for other purposes, as, for instance, in determining the efficiency of a transformer by comparing the respective strengths of the input current and the output current, as well as for a great variety of other purposes.

Having thus described my invention, what I claim is:

1. An audibility meter comprising a primary winding, provided with shunt adjusting means, a secondary winding, means for connecting external appliances and circuits with the windings, and means, in decade arrangement, for measuring the sensitiveness of such external appliances.

2. An audibility meter comprising a primary winding, a secondary winding, a tertiary winding, means for connecting external appliances and circuits with the windings, and means including the primary winding for measuring the sensitiveness of such external appliances by predetermined steps.

3. An audibility meter comprising a primary winding, a secondary winding, a tertiary winding, means for connecting external appliances and circuits with the windings, and means including the primary winding, in decade arrangement, for measuring the sensitiveness of such external appliances.

4. An audibility meter comprising a primary winding, a secondary winding, a shunt resistance for the primary winding, means for connecting external appliances and circuits with the windings, and means including the primary winding for measuring the sensitiveness of such external appliances by predetermined steps.

5. An audibility meter comprising a primary winding, a secondary winding, a shunt resistance for the primary winding, a tertiary winding, means for connecting external appliances and circuits with the windings, and means including the primary winding for measuring the sensitiveness of such external appliances.

6. An audibility meter comprising an air-core transformer, having a primary winding, a secondary winding, means for connecting to the meter, a source of incoming current and a plurality of appliances, a plurality of double acting switches for connecting the source of incoming current directly to one appliance or directly with the primary winding of the transformer, and for controlling the connections of the appliances to the secondary winding of the transformer.

7. An audibility meter comprising an air-core transformer, having a primary winding, a secondary winding, a tertiary winding, means for connecting, to the meter, a source of incoming current and a plurality of appliances, a plurality of double acting switches for connecting the source of incoming current directly with one appliance or directly with the primary winding of the transformer, and for controlling the connections of the secondary winding with one appliance and the tertiary winding with another appliance.

8. An audibility meter comprising an air-core transformer, having a primary winding, a secondary winding, a shunt resistance in circuit with the primary, means for connecting a source of incoming current and a plurality of appliances to the meter, a plurality of double acting switches for connecting the source of incoming current directly with one appliance or directly with the primary winding of the transformer, and for connecting the secondary winding of the transformer and the appliances.

9. An audibility meter comprising an air-core transformer, having a primary winding, a secondary winding and a tertiary winding, a shunt resistance in circuit with the primary winding, means for connecting a source of incoming current and a plurality of appliances to the meter, a plurality of double acting switches for connecting the source of incoming current directly with one appliance or directly with the primary of the transformer, and for connecting the secondary winding with one appliance and the tertiary winding with another appliance.

In testimony whereof, I have hereunto set my hand.

EUGENE GARRETSON.